US009016202B2

(12) United States Patent
Mostowy-Gallagher et al.

(10) Patent No.: US 9,016,202 B2
(45) Date of Patent: Apr. 28, 2015

(54) HIGH SPEED PRINTING INK

(75) Inventors: Maura Mostowy-Gallagher, Succasunna, NJ (US); Ryszard Sprycha, Wallington, NJ (US); Mathew C. Mathew, Cedar Grove, NJ (US); Richard Durand, Oradell, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 13/816,904

(22) PCT Filed: Aug. 18, 2010

(86) PCT No.: PCT/US2010/045873
§ 371 (c)(1),
(2), (4) Date: Feb. 13, 2013

(87) PCT Pub. No.: WO2012/023933
PCT Pub. Date: Feb. 23, 2012

(65) Prior Publication Data
US 2013/0149507 A1 Jun. 13, 2013

(51) Int. Cl.
*C09D 11/033* (2014.01)
*C09D 11/08* (2006.01)
*C09D 1/10* (2006.01)
*C09D 11/102* (2014.01)
*C09D 11/10* (2014.01)

(52) U.S. Cl.
CPC ............ *C09D 11/102* (2013.01); *C09D 11/033* (2013.01); *C09D 11/08* (2013.01); *C09D 11/10* (2013.01)

(58) Field of Classification Search
CPC ...... C09D 11/00; C09D 11/033; C09D 11/08; C09D 11/10
USPC .......... 106/31.13–31.97; 101/491; 428/195.1; 524/35, 270
See application file for complete search history.

(56) References Cited

U.S. PATENT DOCUMENTS

| | | |
|---|---|---|
| 4,612,052 A | 9/1986 | Schwartz |
| 5,658,968 A | 8/1997 | Catena et al. |
| 2011/0247508 A1 * | 10/2011 | Baptista et al. ............... 101/216 |

FOREIGN PATENT DOCUMENTS

| | | |
|---|---|---|
| JP | 58122976 A | 7/1983 |
| WO | WO/96/01866 A1 | 1/1996 |

* cited by examiner

*Primary Examiner* — Bruce H Hess
(74) *Attorney, Agent, or Firm* — Charles C. Achkar; Ostrolenk Faber LLP

(57) ABSTRACT

Formulations for solvent-based flexographic or rotogravure inks, which are capable high-quality, defect-free printing at high speeds, contain flexographic ink resins solutions and solvent mixtures which are designed to maintain a dynamic solubility parameter in the ink as the dry state is approached during the printing process. The inks described show extremely high quality printing at linear press speeds above 1800 fee per minute (ca 0.549 km/min).

17 Claims, 1 Drawing Sheet

HIGH SPEED PRINTING INK

This application is a National Stage Application of PCT/US2010/045873, filed on Aug. 18, 2010.

FIELD OF THE INVENTION

The present invention relates to solvent-based flexographic and/or rotogravure printing inks. More particularly, the invention relates to high linear speed printing applications.

BACKGROUND OF THE INVENTION

Principles of Flexographic Printing

Flexography is one method of printing words and images onto foil, plastic film, corrugated board, paper, paperboard, cellophane, or even fabric. In fact, since the flexographic process can be used to print on such a wide variety of materials, it is often the best graphic arts reproduction process for package printing.

The anilox cylinder serves as the heart of the flexographic press. The use of an ink-metering anilox cylinder, which is engraved with a cell pattern, enables an even and fast ink transfer to the printing plate. The configuration of the cells in the anilox roller, the pressure between the rollers, and the use of a doctor blade mechanism control the amount of ink transferred to the printing plate. The shape and volume of the cells are chosen to suit the anilox surface (chrome or ceramic), the doctoring system, the press capabilities, the printing substrate, and the image type (solid or halftone). Advances in anilox technology have resulted in laser-engraved ceramic anilox rollers offering tougher and longwearing rollers with greatly improved ink release characteristics compared to conventional mechanically engraved chrome roller technology.

Flexography prints can be made with a flexible printing plate that is wrapped around a rotating cylinder. The plate is usually made of natural or synthetic rubber or a photosensitive plastic material called photopolymer. It is usually attached to the plate cylinder with double-sided sticky tape. Flexography is a relief printing process, meaning that the image area on the printing plate is raised above the non-image area.

The image area receives the ink from the anilox roller, which is transferred to the print substrate when the latter is pressed with support of the impression cylinder against the printing plate. Flexography is a direct method, that is, the printing plate transfers the ink directly to the substrate.

Due to improved registration, the most popular type of press is the CI press (central-impression) where printing units are arranged around a single central impression cylinder.

High Speed Flexographic Printing on Flexible Substrates

In general, the higher the speed of the press, the wider the press will be. When the press is wider and faster, the diameter of the anilox roller must be greater in order to prevent damage to the roller due to deflection and bending. A 50-inch (ca 127 cm) machine has a 6-inch (ca 15 cm) diameter anilox cylinder. The dwell time between the chamber and the ink transfer nip is shorter.

Linear speeds in excess of 1800 ft/min (ca 0.549 km/min) are considered high speed for printing flexible substrates, and presses with the capability of printing at a linear speed of 3300 ft/min (ca 1 km/min) are now appearing on the market.

The linear speed of 3300 ft/min (ca 1 km/min) is equal to a linear velocity of 35 miles per hour (ca 56.3 km/hr), and conventional plates and the double-sided sticky tape will eject from the press at this speed. In place of plates and double-sided sticky tape, direct laser engraved elastomer sleeves are used for printing at these velocities. The usual chambered doctor blade has a two-inch gap between the blades, and the dwell time for this distance at 3300 ft/min (ca 1 km/min) is less than the time of a high speed shutter on a 35 mm camera. In that interval, the air must be displaced from the cells of the anilox, ink must enter the cells, and the air must be cycled out from the chamber.

At linear speeds up to 2300 ft/min (ca 0.701 km/min), normal motors can be used; however, at linear speeds over 2300 ft/min water-cooled motors are required.

Many printers require inks and coatings to print at high speeds in order to improve the cost effectiveness of their operations. Flexographic printing linear speeds generally range up to 2000 ft/min (ca 0.609 km/min), and that speed can be expected to increase. At increasing linear speeds, for example greater than 1200 ft/min (ca 0.366 km/min), and especially 1800 ft/per minute (ca 0.549 km/min), the printability of the ink begins to deteriorate and print defects can be observed. This defect can be described as uniformly dispersed, irregularly shaped missed areas of printing. These defects are believed to result from the inability of the ink to wet out the surfaces of the printing blanket or plate or the substrate, or from the distinct mechanistic demands associated with a high speed printing press configuration as discussed in the above paragraphs.

Inks for Linear High Speed Printing

The transfer of ink to the substrate is one of the most important factors affecting the quality of the final printed product. However, due to dynamics of linear high-speed presses, conventional inks used for slower speeds will breakdown at high speeds, creating print defects. Any print defect will negatively affect productivity and the inherent printing advantages of using linear high-speed presses.

Typical flexographic printing inks contain resins, solvents, colorants, and additives. The resins include rosin esters, polyamides, polyurethanes, nitrocellulose, and others. The solvents are often based on alcohols, acetates, glycol ethers, and possibly other solvent classes.

In this invention, the resin solvents are formulated so that as drying proceeds the solubility parameter is maintained within a certain range as the various solvent components evaporate at different rates. As evaporation proceeds and the solvent composition changes, the solubility parameter must be maintained, or varied in a direction favorable to high quality printing.

The theoretical mechanism for high quality flexographic or rotogravure printing at high speed is the complete leveling of ink on the plate before the printing nip, which is favored by optimal resolubility, which in turn is controlled by the balance of solubility parameters between the resins and the solvent blend of the formulation.

Resolubility in this context refers to dynamic resolubilization of ink resins on the anilox cylinder. If the wet ink has poor resolubility, it cannot re-dissolve the partially dry ink on the anilox roller so that it can be transferred cleanly to the plate cylinder in the time frame of the next impression. Excessive drying will contribute to print defects described as pinholing, dirty printing, or otherwise simply as poor printability. Undesired retention of solvents, on the other hand, leads to poor lamination bond strength, blocking in the rewind, and odor, due to solvent retention in the print. Print quality is assessed using microscopy, and poor print quality as print speed increases can be observed as areas of non coverage of ink. As print quality deteriorates, the frequency of these non-printed areas increases. Bond strength of laminations is measured as the force per linear inch needed to separate the plies of the lamination.

According to this invention, printability is improved by optimizing the solubility parameter of the resins in the ink formulation and by optimizing the relationship of the solubility parameter of the resins to that of the solvent blend of the formulation. In theory, resolubility can be improved by optimizing the solubility parameter of the solvent blend as it relates to that of the ink resins. As the compatibility of the components of the solubility parameter between the solvent and the ink solids is improved, the resolubility is increased, and printability can have improved quality especially at higher print speeds. The total solubility parameter, $\delta_T$, is related to the sum of the individual components which contribute to it: the dispersive component ($\delta_D$), the hydrogen bonding component ($\delta_H$), and the polarity component ($\delta_P$).

Solubility Parameters

Solubility parameters are used in the coatings industry to predict the solubility of a polymer or resin in a given solvent, or the miscibility of two liquids, or other solids with a liquid. The solubility parameter, $\delta$, first described by Hildebrand, is derived from the cohesive energy density, which is in turn derived from the heat of vaporization. For solvents, this concept is straightforward, as the cohesive energy density is a numerical value that indicates the energy of vaporization in calories per cubic centimeter, and reflects the attractive forces between the molecules of a liquid or solid, for example, van der Waals forces, hydrogen bonding, etc. In a discussion of solubility, the same intermolecular forces that must be overcome to separate the molecules of a liquid during evaporation are involved in the dissolution of a solid.

The concept of the solubility parameter was introduced by Hildebrand as the square root of the cohesive energy density, as a value to indicate the solvency behavior of a solvent (Reference 1).

$$\delta = \sqrt{c} = [(\Delta H - RT)/V_m]^{1/2}$$

where c=cohesive energy density
$\Delta H$=the heat of vaporization
R=the gas constant
T=temperature
$V_m$=molar volume The values are traditionally expressed in units of calories per cubic centimeter, but the newer SI units are expressed in units of pressure, MPa. 1 MPa=1 J/cm$^3$. Since the solubility parameter is the square root of the cohesive energy density, the units of solubility parameters are thus in terms of (MPa)$^{1/2}$ or (J/cm$^3$)$^{1/2}$. Literature prior to 1984 will contain only the common units of (cal/cm$^3$)$^{1/2}$. The newer SI units are often designated by $\delta$(MPa$^{1/2}$) or $\delta$(SI). This document uses the SI units of (MPa)$^{1/2}$ or (J/cm$^3$)$^{1/2}$.

The solubility parameters of individual solvents are readily available or can be calculated from experimentally determined physical constants or from the structural formula of a molecule. The latter method is referred to as the group contribution method, and is normally used when the data for the calculation from physical constants is unavailable or is considered unreliable. The solubility parameters of polymers can be determined by solubility tests or swelling experiments in a series of solvents. It is found that solvents with a range of solubility parameters around that of the polymer will dissolve the uncrosslinked polymer, or will swell a polymer if crosslinked.

The above describes the single-component Hildebrand parameter, however, the true behavior of actual solvents cannot be fully explained on the basis of only this parameter, and can be better understood through the use of three types of polar interactions that contribute to the overall solubility parameter: dispersion forces, polar forces, and hydrogen bonding. The most widely accepted three-component system to date is the three-parameter system developed by Charles M. Hansen in 1966. The Hansen parameters are additive and can be expressed relative to the total solubility parameter according to the following equation:

$$\delta_T^2 = \delta_D^2 + \delta_P^2 + \delta_H^2$$

The concept of the solubility parameter is well understood by anyone skilled in the art. The detailed description of the derivation and theory is found in various references such as:

(1) A. F. M. Barton, "Handbook of Polymer-Liquid Interaction Parameters and Solubility Parameters," CRC Press Inc. (1990).
(2) D. W. Van Krevelin, "Properties of Polymers—Their Estimation and Correlation with Chemical Structure," 3$^{rd}$ Ed., Elsevier (1976).
(3) Solubility Parameters, Theory and Application, John Burke. American Institute for Conservation, The Oakland Museum of California. Book and Paper Group Annual, Volume 3 (1984). Craig Jensen, Ed. pp. 13-58.

The individual components of the solubility parameter, such as the polar component and the hydrogen bonding component must be such that they provide optimal solubility of the ink resins, and maintain this property as the individual solvents in the mixture evaporate during drying. Because the individual components in the solvent mixture have different solubility parameters from those of the mixture, the overall solubility parameter and its components will change as drying proceeds. If the solubility parameters change enough that they are no longer compatible with the resin solids, the resolubility of the ink or coating will be affected and print quality will deteriorate.

The use of solubility parameter to control the affinity of a resin for a solvent is the basis of US Patent Application No. US 2004/0221939 A1 for a pressure-sensitive adhesive sheet for removal of a solvent-containing substance such as a paste ink from the back of a screen printing plate. This patent teaches that the adhesive of the adhesive layer must have a solubility parameter that is within +/−4 units of (J/cm$^3$)$^{1/2}$ of that of the solvent to be removed. In other words, for the adhesive sheet to interact with and remove the solvent-containing ink, the respective solubility parameters must be alike within 4 units.

The importance of compatible solubility parameters between ink resins and the ink solvents is addressed in US Patent Application US 2009/0137713 A1. The storage stability of a fluid marking ink for covered electric wire relies upon the satisfaction of several equations describing the relative solubility parameters of the organic solvent, $\delta_1$, the oil-soluble dye, $\delta_2$, and the oil soluble resin, $\delta_3$. It is required that the absolute values of the differences between the organic solvent and the dye is not more than 3 (J/cm$^3$)$^{1/2}$, and the difference between the organic solvent and the oil-soluble resin must also be within 3 (J/cm$^3$)$^{1/2}$. This patent also teaches that the adhesive strength of the marked ink on the substrate, the covered electric wire, requires that the solubility parameters of the ink resin and the substrate are within 5 (J/cm$^3$)$^{1/2}$.

U.S. Pat. No. 7,615,583 B2 provides examples of the use of resins, dispersing agents, and solvents with high polarity, which are preferred in the preparation of colorant dispersions for energy curable flexographic or ink jet inks due to the high solubility parameters of polymerizing monomers. This patent also discusses the importance of solubility parameter in selecting a blend of reactive monomers in a formulation to achieve adequate adhesion to various base materials. The upper limit is no more than a difference of 2.5 units of solubility parameter between the maximum and minimum values for monomers in a formulation, but preferably they should be within 1 unit of solubility parameter relative to one another.

UK Patent Application GB 2003 904 A for polymeric thickeners, with applications in organic solvent-based gravure inks, particularly as substitutes for cellulose derivatives, includes a detailed treatment of solubility parameter. The invention relies on the solubility of the polymeric thickeners; and the solubility parameter of the polymer components forms the basis of the invention. The composition contains an addition polymer of ethylenically unsaturated monomers comprising at least one hydrophobic monomer being in the hydrogen bonding class of moderate to poor; and at least one hydrophilic monomer being in the strong hydrogen bonding class within a specified weight ratio. Also, at least 60% by weight of the hydrophobic monomers must be from those whose homopolymers have a solubility parameter of 8.8 or less. This property allows the thickener to be effective in ink formulations with solvents rich in aliphatic hydrocarbons, such as gravure inks which contain metallized rosin ester binders.

U.S. Pat. No. 7,014,973 B2, which relates to liquid toner compositions for electrophotography, describes the use of solubility parameters to control the stability of toner particles in a liquid carrier. The toner particles are stabilized with an amphipathic copolymeric binder, which is comprised partly of monomeric residues of a soluble high $T_g$ monomer, where the absolute difference in solubility parameter of the soluble high $T_g$ monomer and the liquid carrier is less than 3 MPa$^{1/2}$.

These examples illustrate the use of solubility parameter to control static properties of an ink formula, such as the liquid dispersion stability. The present invention, however, relates to the use of the solubility parameter as it relates to the dynamic process of printing, and specifically high speed flexographic printing.

The solubility parameters of the resins may be obtained from product literature where available, or estimated from studies of similar materials as published in the Handbook of Polymer-Liquid Interaction Parameters and Solubility Parameters, by Allan F. M. Barton, CRC Press (1990), or as determined by solubility studies. The solubility parameters of solvent mixtures are calculated using the sum of volume fractions of the individual solvent components in the ink. Total solubility parameters as well as the three-component Hansen parameters for dispersive, polar, and hydrogen-bonding components of the solubility parameter, are readily available in the literature.

It has been found that for printing at high linear speeds, the relationship between the solubility parameters of the resins in the inks and the solubility parameters of the solvent mixture can be optimized so that resolubility is improved and ink defects are reduced and the quality of the print is increased. For example, Table 1 shows the print quality, expressed as the percent area of non-printed area (defect area) as a function of the solubility parameter of the solvent blends and the estimated SP of the resins in several inks, and FIG. 1 plots the relation between the solubility parameter of the solvent blend and the print quality. A lower percent defunct area indicated higher print quality.

TABLE 1

|  | $\delta_T$, solvent blend (J/cm$^3$)$^{1/2}$ | Est. $\delta_T$, resins (J/cm$^3$)$^{1/2}$ | Defect area, % |
|---|---|---|---|
| Ink 1 at 1300 ft/min | 23.1 | 23.0 | 8.86 |
| Ink 2 at 1000-1200 ft/min | 22.3 | 19.1 | 5.25 |
| Ink 3 1500 ft/min | 22.8 | 19.4 | 2.08 |
| Ink 4 at 2000 ft/min | 21.0 | 20.6 | 0.06 |

TABLE 1-continued

|  | $\delta_T$, solvent blend (J/cm$^3$)$^{1/2}$ | Est. $\delta_T$, resins (J/cm$^3$)$^{1/2}$ | Defect area, % |
|---|---|---|---|
| Ink 5 at 1700 ft/min | 23.0 | 20.6 | 3.97 |
| Ink 5 with modified solvent blend at 1700 ft/min | 20.7 | 20.6 | 0.41 |

As an ink film dries on a printing press, whether this film is on the anilox cylinder, the plate, or the substrate, the resin solids remain constant, but the solvent composition varies as lower volatility solvents evaporate at a different rate than the higher volatility solvents in the mixture. This leads to a change in the relative solubility parameters of the resins and solvent mixture. Table 2 shows the solubility parameter of four inks in (J/cm$^3$)$^{1/2}$ relative to the total non-volatiles (TNV) as drying proceeds, and FIG. 2 plots those results.

TABLE 2

| % TNV | Ink 1 | Ink 2 | Ink 3 | Ink 4 |
|---|---|---|---|---|
| 25.9 |  |  | 22.6 |  |
| 29.5 |  |  |  | 21.0 |
| 29.7 | 23.1 |  |  |  |
| 38.8 |  | 22.3 |  |  |
| 29.3 |  |  | 22.8 |  |
| 31.2 |  |  |  | 20.9 |
| 37.9 | 23.6 |  |  |  |
| 38.9 |  | 22.3 |  |  |
| 32.8 |  |  |  | 20.7 |
| 35.7 |  |  | 23.2 |  |
| 43.0 |  | 22.5 |  |  |
| 50.2 | 24.0 |  |  |  |
| 32.7 |  |  |  | 20.7 |
| 43.5 |  |  | 22.4 |  |
| 45.3 |  | 22.7 |  |  |
| 34.3 |  |  |  | 20.3 |
| 47.4 |  | 22.9 |  |  |

The dynamic change in solubility parameter of the solvent mixture as drying proceeds must therefore be known in order to understand and control the behavior of resolubility during printing. The fractional components of solvents in the ink as drying proceeds are estimated by carrying out drying studies in which an ink formulation is gradually dried using rotary evaporation and the resulting solvent mixture is analyzed stepwise as the drying progresses.

SUMMARY OF THE INVENTION

The present invention relates to solvent-based flexographic or rotogravure ink or coating formulations comprising printing ink resins or binders, dispersed colorants (optional), solvents, and various additives. The ink resins may include polyamides, polyurethanes, rosin esters, metallized rosin esters, nitrocellulose, or other printing ink resins. The dispersed colorants are comprised of any of a number of various pigments, pigment dispersions, or other colorants. The solvents include any of a number of organic solvents such as those selected from various alcohols, acetates, and glycol ether solvents. Typical examples include ethanol, normal propyl alcohol, normal propylacetate, isopropylacetate, ethylacetate, diacetone alcohol, propylene glycol monopropyl ether, and propylene glycol monopropyl ether acetate. The solvent component may also include water in an amount of up to about 5 wt %, and preferably about 0.5 to 2% when present.

An extensive listing of commercially available resins, solvents, and colorants, as well as other conventional components, can be found in The Printer's Manual, which is hereby incorporated herein by reference. Drying of the composition can be by application of heat or actinic radiation, and in the latter instance photoinitiators may be present.

In preferred embodiments, these solvents are selected in order to have solubility parameters with values that are compatible with those of the ink resins in the particular formulation, especially when the solubility parameter of the resins lie within a certain range, and especially to maintain the desired solubility parameters as the solvent profile changes with the dynamic conditions of high speed drying. The ink compositions according to the invention provide a system where surprisingly high print quality can be achieved at extraordinarily high press speeds. This can be achieved by selecting appropriate resins and controlling the solvent blend mixtures. Typical formulations where the solubility parameter of the solvent blend is greater than 23.5 $(J/cm^3)^{1/2}$ can show drastically reduced print quality at linear press speeds in excess of 1000 to 1200 feet per minute (ca 0.305-0.366 km/min). Preferred formulations, however, provide solvent blends that maintain desirable solubility parameters even as drying is approached and the solvents leave the ink film as the dried state is approached.

BRIEF DESCRIPTION

The present invention is a coating or ink in which the resins are balanced to have a certain average value of solubility parameter (SP), and the solvent blend is designed in order to have a solubility parameter that is optimal for the resolubility of flexographic resins. The effect of the formulation of the resins and the solvents is that as the solvent mixture evaporates, the SP of the overall mixture will remain favorable to the resolubilization of the resin solids in the ink or coating as the print speed increases, and print quality is maintained even at print speeds exceeding 1800 linear feet per minute (ca 0.549 km/min).

DETAILED DESCRIPTION

Figure 1:
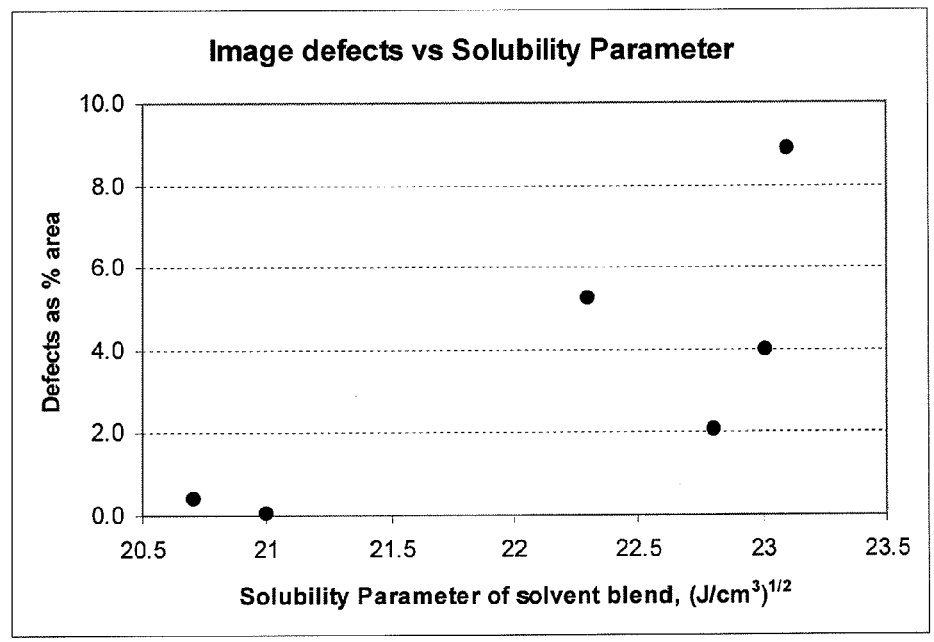
FIG. 1 shows the percent area of non-ink coverage in a solid print region, i.e., the total area of ink defect, as a function of the solubility parameter of the solvent blend in the virgin ink for various ink formulations.
Figure 2:
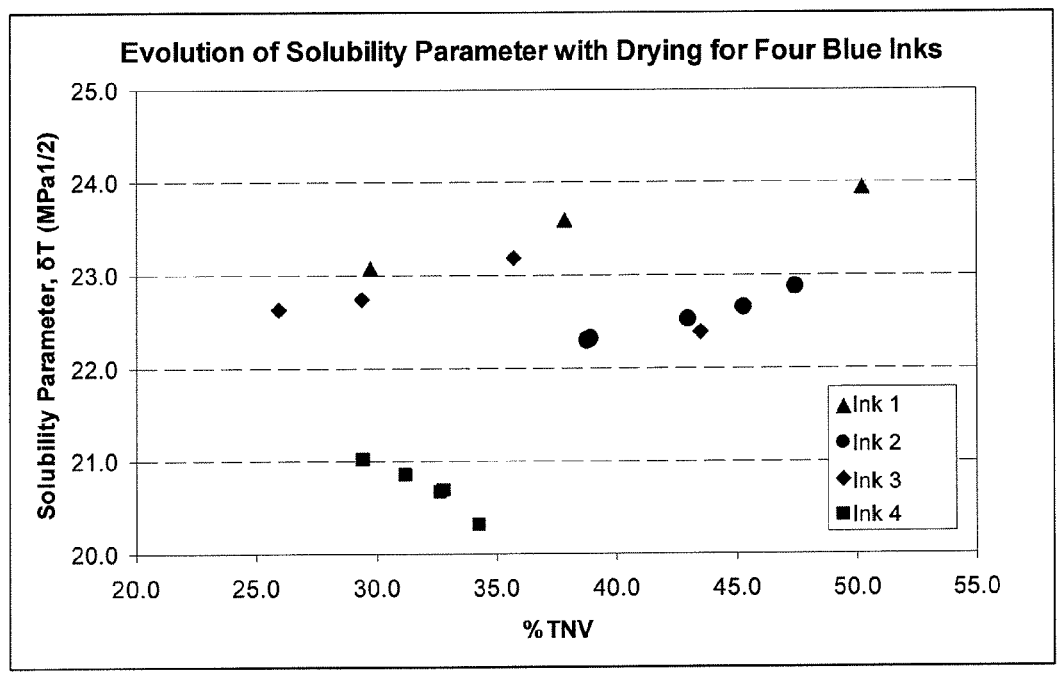
FIG. 2 shows the change in solubility parameter of the solvent blend as drying progresses for four ink formulations.

The examples of the present invention, which is described in the following examples, are not considered to be exhaustive or to limit the invention to the precise formulations disclosed. Rather, the examples selected are chosen and described so that anyone skilled in the art could understand the concepts and strategies of the present invention.

The present invention provides a flexographic and or rotogravure printing ink or coating composition that contains resins within a preferred range of solubility parameter and with a specific solvent blend for use in high linear speed printing applications. The solvent mixture must be such that as rapid evaporation of the solvent components in the solvent mixture proceeds from the thin film of ink on the roller train surfaces, such as the blanket, plate, and substrate, the overall mixture can maintain the desired solubility parameters for the ink resins up to the point of the nearly dried state of the ink film.

In general, the binder resin component is about 5 to 30 wt % of the composition, preferably about 10 to 15 wt %, the solvent is about 40 to 70 wt % of the composition, preferably about 60 to 70 wt %, the colorant when present is about 4 to 25 wt % of the composition, preferably about 15 to 18 wt %, and the other components make up the balance. Water, when present, is up to about 5 wt %, preferably about 0.5 to 2%

The binder system of the ink formulations is selected in order to provide the range of printing properties which are required for flexographic or rotogravure printing, in terms of the final properties of the printed films with respect to print quality and aesthetics, color, opacity, ink adhesion and lamination properties, barrier properties, pigment dispersion, special effects, blocking requirements, sealing properties, surface resistance, drying, and myriad others. The colorant is selected to provide a typical full gamut of hues typical of flexographic and rotogravure printing, and to be consistent with the required properties and print quality as noted above. The inks of the present invention will contain various additives such as slip agents, waxes, and others typically used in flexographic and rotogravure inks to achieve required properties as described above. The solvent blend of the ink formulations of this invention are selected such that the total solubility parameter and the individual components of the solubility parameter for the solvent mixture are compatible with those of the ink binder resins in a way that is optimal for resolubility during printing. The solvent mixture is also formulated in a way that is optimal for the dynamic drying process which occurs on press during printing and during the film-formation process of the ink on the substrate.

EXAMPLES

Any combination of ink resin and solvent mixture that can print substantially defect free (i.e., where the defect area is less than about 6% of a print area of at least about 30,000 square microns) at linear print speeds of at least 1800 feet per minute (ca 0.549 kilometers per minute) can be employed. Preferably, the ink can print with minimal print defects at speeds in excess of 2000 feet (ca 0.609 km/min.). As used herein, "defect free" means that areas of missed ink transfer in the print are minimal or absent, especially in a solid area of ink coverage. Defects are quantified by using optical microscopy, where photomicrographs are analyzed with the use of image processing software to calculate the total quantified area of unprinted area.

Example 1

In one example, several formulations of a blue flexographic ink were formulated with variations of resins and solvent blends in which the solubility parameter was changed. The best printability at the highest speeds were obtained for formulations where the resins had an estimate weighted solubility parameter average of 20.6 $(J/cm^3)^{1/2}$ or less, and the solvent blend had an overall solubility parameter of 21.0 or less. The change of solubility parameter of the resins and the solvent blend of the virgin inks resulted in a marked improvement in the high speed printability on an F & K ten-color flexographic CI wide web printing press.

One preferred formulation is an ink containing a blend of resins which includes nitrocellulose, rosin ester, and polyamide and a solvent blend that has an average weighted (i.e., taking concentration into consideration) solubility parameter value of 23.1 $(J/cm^3)^{1/2}$ for the resins, and a total solubility parameter of 23.0 $(J/cm^3)^{1/2}$ for the solvent blend. The total solubility parameter of the solvent blend is calculated from the sum contributions of individual solvents according to the fractional volumes of the solvents in the blend. Preferred is an ink formulated with a blend of resins which includes nitrocellulose and rosin esters so that the solvent blend has an average weighted solubility parameter value of 22.3 $(J/cm^3)^{1/2}$ and with a solvent blend formulated so that the solubility parameter of the mixture is 19.1 $(J/cm^3)^{1/2}$. Especially preferable is the formulation containing a blend of resins which includes a polyamide and rosin ester so that the average weighted solubility parameter of the resins is 21.0 $(J/cm^3)^{1/2}$ and a solvent blend formulated so that the total solubility parameter is 20.6 $(3/cm^3)^{1/2}$.

In this example, four inks were printed on an F & K ten color flexographic CI wide web printing press. The quality of the images was determined using microscopy to observe the frequency of void spaces interrupting a solid print area. The speeds were 1000 to 2000 feet per minute.

Ink A was applied at 1300 ft/min (ca 0.396 km/min); $\delta_T$ (solvent)=23.1 $(J/cm^3)^{1/2}$; $\delta_T$ (resins)=23.0 $(J/cm^3)^{1/2}$; and the area of defects=8.86%

Ink B was applied at 1000-1200 ft/min(ca 0.3-0.37 km/min); $\delta T$ (solvent)=22.3 $(J/cm^3)^{1/2}$; $\delta_T$(resins)=19.1 $(J/cm^3)^{1/2}$; and the area of defects=5.25%

Ink C was applied at 1500 ft/min (ca 0.457 km/min; $\delta T$ (solvent)=22.6 $(J/cm^3)^{1/2}$; $\delta_T$ (resins)=19.4 $(J/cm^3)^{1/2}$; and the area of defects=2.08%

Ink C was applied at 2000 ft/min (ca 0.609 km/min); $\delta T$ (solvent)=21.0 $(J/cm^3)^{1/2}$; $\delta_T$ (resins)=20.6 $(J/cm^3)^{1/2}$; and the area of defects=0.06%

Example 2

In Example 2, a blue flexographic ink was formulated based on polyamide and rosin esters so that the estimated average weighted solubility parameter of the resins was 20.6 $(J/cm^3)^{1/2}$ and the solvent blend had a total solubility parameter of 23.0 $(J/cm^3)^{1/2}$. The printed solid area had a defect area of 3.97% when printed at a linear speed of 1700 ft/min (ca 0.52 km/min). This ink was free of defects at speeds up to 1200 ft/min (ca 0.37 km/min).

The improved ink was reformulated so that the solvent blend had a total solubility parameter of 20.7 $(J/cm^3)^{1/2}$, and at a linear printing speed of 1700 to 2000 ft/min the printed solid area had a defect area of only 0.41%. The limitation was the tension control of the press; defects were not observed at the maximum speed allowable by the conditions of the press.

What is claimed is:

1. A printing ink comprising a resin component which is one or more flexographic resins, one or more colorants, and one or more solvents, wherein the resin component has a weighted average solubility parameter of 18 to 23 $(J/cm^3)^{1/2}$; wherein:
   a) the resin is at least one member of the group consisting of rosin esters, nitrocellulose, polyamides, polyvinyl butyral, cellulose acetate proprionate, cellulose acetate butyrate, polyketone, acrylics, ethyl cellulose, maleics, epoxy resins, polyesters, vinyl resins, shellac, ethyl hydroxyl ethyl cellulose, and polyurethanes; and
   b) the solvent is a blend of different solvents and the blend has a total solubility parameter in the range of 18 to 25 $(J/cm^3)^{1/2}$.

2. The ink of claim 1 wherein the weighted average solubility parameter of total resins is 18-21 $(J/cm^3)^{1/2}$.

3. The ink of claim 1, wherein the solvent comprises a positive amount of water in an amount of up to 5 wt %.

4. The ink of claim 3, wherein the amount of water is up to 2 wt %.

5. The ink of claim 1, wherein the solubility parameter of the solvent blend is 18 to 21 $(J/cm^3)^{1/2}$.

6. The ink of claim 1, wherein the resin component weighted average solubility parameter and the solvent blend total solubility parameter are such as to achieve substantially defect-free printing at press speeds of at least 0.549 km/min.

7. The ink of claim 1, having a composition in which the overall dynamic solubility parameter of the solvent blend, which evolves as drying is approached, is maintained or decreases as the solvent mixture changes with the unequal rates of evaporation of individual solvent components.

8. The ink of claim 1, containing a solvent blend having an overall solubility parameter of 22.5 to 25.0.

9. The ink of claim 8, wherein the overall solubility parameter is up to about 23.

10. The ink of claim 8, wherein the overall solubility parameter is about 17 to 21 $(J/cm^3)^{1/2}$.

11. The ink of claim 10 in which the weighted average solubility parameter of total resins in the ink is 18 to 21 $(J/cm^3)^{1/2}$.

12. The ink of claim 1, wherein the difference between the resin component and the solvent blend solubility parameters is less than 4 $(J/cm^3)^{1/2}$.

13. The ink of claim 12 in which the solvent of the ink is a blend of different solvents and the blend has a total solubility parameter in the range of 18 to 25 $(J/cm^3)^{1/2}$.

14. A method of printing which comprises applying an ink of claim 1 to a substrate which is moving at a linear speed of at least 0.549 km/min.

15. The method of claim 14 in which the substrate is a flexible substrate.

16. A method of printing which comprises selecting an ink which comprises a resin component which is one more flexographic resins, one or more colorants, and one or more solvents, and in which the resin component has a weighted average solubility parameter of 18 to 23 $(J/cm^3)^{1/2}$, and applying the selected ink to a substrate which is moving at a linear speed of at least 0.549.

17. A method of formulating an ink suitable for high speed printing which comprises combining one or more flexographic resins, one or more colorants, and one or more solvents, wherein the resin component has a weighted average solubility parameter of 18 to 23 $(J/cm^3)^{1/2}$; and wherein the solvent is a blend of different solvents and the blend has a total solubility parameter in the range of 18 to 25 $(J/cm^3)^{1/2}$.

* * * * *